United States Patent [19]

Avery et al.

[11] Patent Number: 4,873,894
[45] Date of Patent: Oct. 17, 1989

[54] BALANCED FREE-PLANET DRIVE MECHANISM

[75] Inventors: Bennett W. Avery, Princeville; William K. Engel, Peoria, both of Ill.

[73] Assignee: Caterpillar Inc., Peoria, Ill.

[21] Appl. No.: 264,583

[22] Filed: Oct. 31, 1988

[51] Int. Cl.[4] ............................ F16H 1/36; F16H 1/28
[52] U.S. Cl. ........................................ 74/785; 74/801; 74/391
[58] Field of Search ................ 74/797, 785, 801, 401, 74/391; 180/10, 255

[56] References Cited

U.S. PATENT DOCUMENTS

| | | | |
|---|---|---|---|
| 3,245,279 | 4/1966 | Baker | 74/410 |
| 3,307,433 | 3/1967 | Bennett et al. | 74/801 |
| 3,421,596 | 1/1969 | Christenson et al. | 74/801 X |
| 3,502,166 | 3/1970 | Christenson et al. | 74/801 X |
| 3,540,311 | 2/1969 | Chillson | 74/797 |
| 4,092,878 | 6/1978 | Campbell | 74/801 |
| 4,132,131 | 1/1979 | DeBruyne | 74/675 |
| 4,140,198 | 2/1979 | Chamberlain | 180/75 |
| 4,252,034 | 2/1981 | DeBruyne | 74/675 |

FOREIGN PATENT DOCUMENTS

| | | | |
|---|---|---|---|
| 0065646 | 4/1984 | Japan | 74/801 |
| WO81/00899 | 4/1981 | PCT Int'l Appl. | 74/801 |
| 1017859 | 5/1983 | U.S.S.R. | 74/801 |

OTHER PUBLICATIONS

Article entitled "Design Study of Self-Aligning Bearingless Planetary Gear (SABP)" by D. J. Folenta, published circa Jan. 1983.

Primary Examiner—Dwight G. Diehl
Assistant Examiner—William Gehris
Attorney, Agent, or Firm—Charles E. Lanchantin, Jr.

[57] ABSTRACT

A balanced free-planet drive mechanism includes a reaction ring gear, an output ring gear, an input sun gear arranged along a central axis, and a plurality of floating planet elements individually having a first planet gear engaged with the sun gear, a second planet gear engaged with the output ring gear, and a third planet gear engaged with the reaction ring gear. A required first rolling ring gear resists radially inward movement of the planet elements adjacent the third planet gear, and an optional second rolling ring gear resists radially inward movement of the planet elements adjacent the first planet gears to maintain the planetary elements essentially parallel to the central axis. A plurality of ring segments are connected to the output ring gear and engage a groove in each of the planet elements to maintain the planet elements in a preselected axial position and to transmit relatively low thrust forces. The drive mechanism is easy to assemble in a ground-engaging wheel of a truck or the like, with the output ring gear being connected to rotate with the wheel. The incorporation of the drive mechanism in a wheel eliminates the usual planet carrier and planetary bearings associated with a conventional multi-stage planetary final drive, and is lighter in weight and less costly while fitting compactly within the same general space envelope.

29 Claims, 4 Drawing Sheets

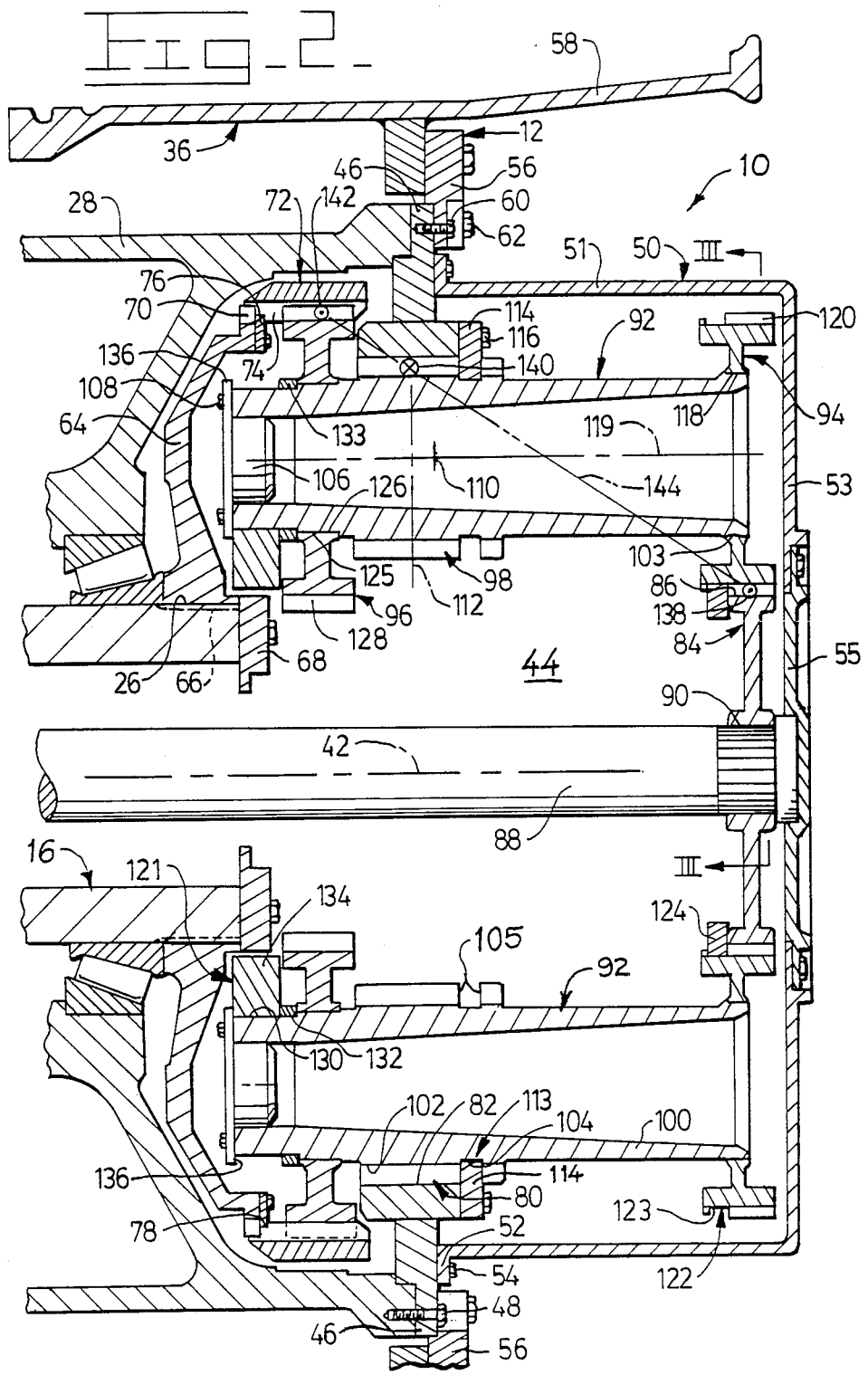

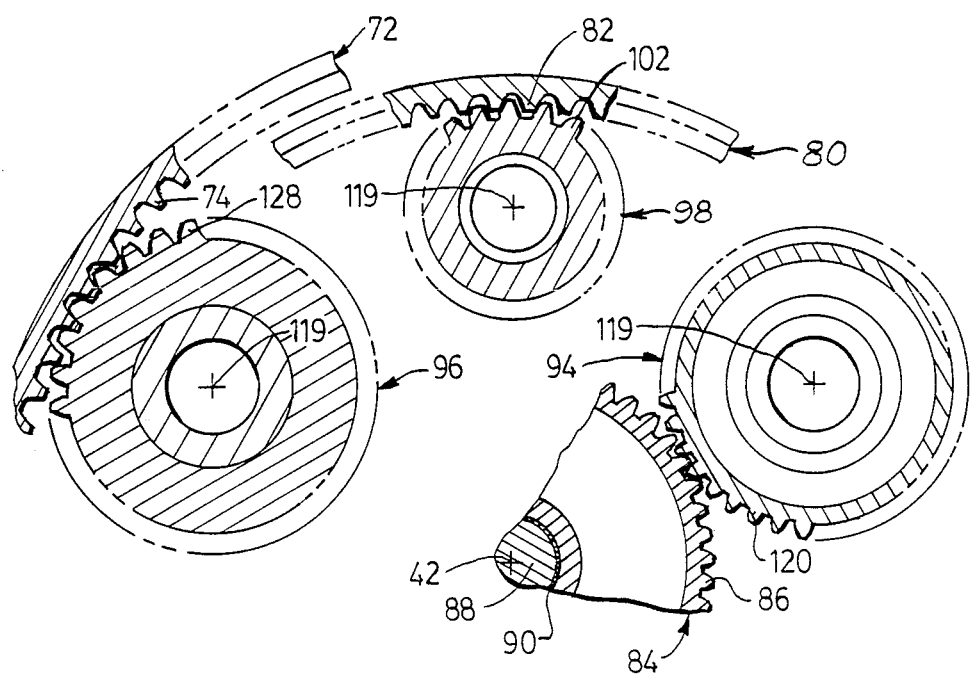
Fig_3_

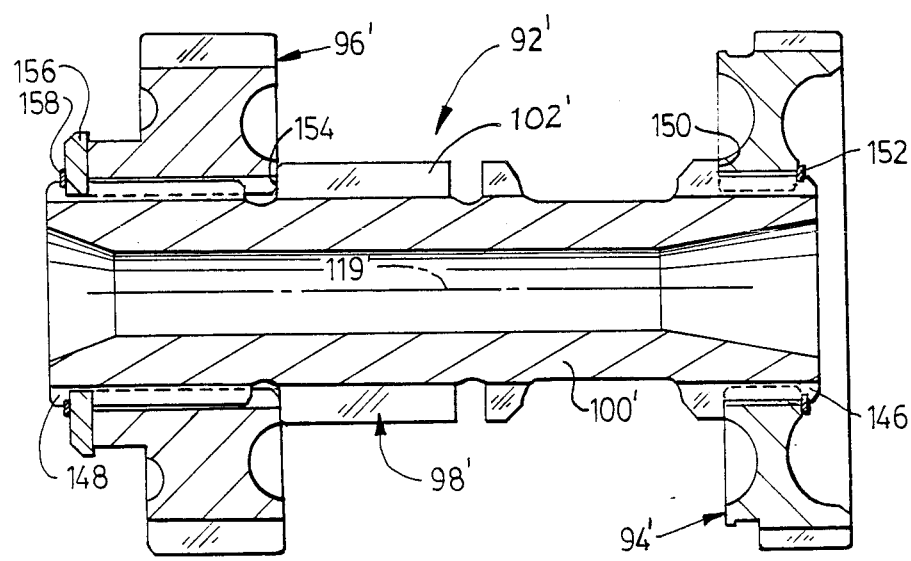
Fig_4

BALANCED FREE-PLANET DRIVE MECHANISM

DESCRIPTION

1. Technical Field

This invention relates to a planetary gear drive mechanism including a sun gear, two ring gears, and a plurality of floating planet elements connecting the sun and ring gears in such a manner that certain forces are in equilibrium and the usual planet gear support bearings are avoided.

2. Background Art

U.S. Pat. No. 3,540,311 issued on Nov. 17, 1970 to C. W. Chillson discloses a free-floating planetary transmission specifically tailored for driving the rotors of a helicopter. In that transmission, the load forces on each planetary element are so spaced apart axially as to establish that the net moment tending to tilt each planetary element out of its radial plane is substantially zero. In other words, that planetary transmission is so designed that tangential gear forces are in equilibrium on the planetary elements in both the axial and the radial planes. With that construction, the usual planet carrier and planet bearings are avoided so that the total weight thereof and the total number of parts can be reduced at a substantial cost savings.

In early 1970, two prototype transmissions for helicopters were built and tested, and a design study was subsequently made for the drive and reported on in NASA Publication 2210, Advanced Power Train Technology under an article by D. J. Folenta entitled "Design Study of Self-Alining Bearingless Planetary Gear (SABP)" and published circa January, 1983.

Turning now away from helicopters, it has long been known to employ planetary gear mechanisms in the final drives of earthmoving vehicles, such as large off-highway trucks, to provide a significant speed reduction ratio adjacent the ground-engaging wheels. For example, where relatively high speed reduction ratios are desired, many final drive mechanisms employ two serially connected planetary gear sets, with each set incorporating a planet carrier, a plurality of planet gears, and a plurality of bearings to support the planet gears in the carriers. Not only do the planet carriers and plurality of bearings contribute to the complexity and total cost of such final drives, but also the planet carriers distort under load causing uneven loading of the associated components, and the planet bearings fail due to the uneven loading and because of high centripetal forces at high speeds.

Thus, what is desired is to apply the helicopter power transmission principles taught in U.S. Pat. No. 3,540,311 to a powered vehicular final drive. In the environment of a helicopter power transmission, the speed and torque ranges are relatively constant once the aircraft has reached its lift speed. On the other hand, there are substantially different operating conditions in a vehicular final drive because the ground-engaging wheel varies from near stall speed at very high torque levels to a relatively high ground speed of over 40 mph at substantially reduced torque levels. For example, the prior art helicopter transmissions did not make any provision for the drive running at high speed with little or no torque or tooth loading, whereas it is one object of the present invention to make such provision through the selection of tooth geometry and the location of the center of gravity of the floating planet elements so that centripetal forces can be accommodated. With such construction, the usual planet carriers and planet gear bearings can be eliminated, and the total weight and number of parts in the vehicular final drive can be substantially reduced. The desired drive mechanism must be sufficiently compact as to be axially contained between the usual wheel support on the inboard end and the wheel cover on the outboard end, and as to be radially contained within the inner radius of existing wheel housings so that standard wheel components can be retained.

The planetary transmission of U.S. Pat. No. 3,540,311 also utilized a plurality of cylindrical supporting rings that the planet elements freely rolled on or in, and that provided a reaction for tooth separating forces and centrifugal forces on the planet elements. Such rolling rings should be so constructed and arranged when utilized in a final drive within a wheel as to effectively balance the radial forces acting thereon from the intermeshing gear teeth forces of the floating planet elements, while simultaneously allowing the convenient assembly and disassembly of the various components. And, still further, the specific construction of the gear teeth of the planet elements, the weight distribution within the planet elements for best balancing of the centrifugal forces acting thereon, and the best way to limit axial movement of the planet elements and/or to absorb axial thrust forces on the planet elements must also be taken into consideration.

The present invention is directed to overcoming one or more of the problems as set forth above.

DISCLOSURE OF THE INVENTION

In one aspect of the present invention, a balanced free-planet drive mechanism includes a hollow support assembly, a ground-engaging wheel rotatably mounted on the support assembly along a central axis, a reaction ring gear connected to the support assembly, an output ring gear connected to the wheel, an input sun gear, a plurality of floating planet elements individually including an axially outer gear intermeshed with the sun gear, an axially inner gear intermeshed with the reaction ring gear, and an axially intermediate gear intermeshed with the output ring gear, and further including rolling ring means substantially concentrically disposed along the central axis for limiting radial inward movement of the planet elements.

In another aspect of the invention a balanced free-planet drive mechanism includes a hollow support assembly, a reaction ring gear connected to the support assembly, an output ring gear rotatably mounted on the support assembly, an input sun gear, and a plurality of floating planet elements individually having a planet shaft with first, second and third planet gears thereon. The first planet gears are intermeshed with the sun gear at a plurality of first pitch midpoints, the second planet gears are intermeshed with the output ring gear at a plurality of second pitch midpoints, and the third planet gears are intermeshed with the reaction ring gear at a plurality of third pitch midpoints. Advantageously, the planet gears are so constructed and arranged that the first, second and third pitch midpoints of each of the floating planet elements are in a straight line for force-balancing purposes, and the drive mechanism includes rolling ring means for solely limiting radially inward movement of the floating planet elements and positioning means for maintaining the planet elements in a preselected axial location relative to the output ring gear.

In still another aspect of the invention, a motor vehicle is provided with a balanced free-planet drive mechanism including a hollow support assembly having a reaction ring gear connected thereto, a ground-engaging wheel rotatably mounted on the support assembly and having an output ring gear connected thereto, an input sun gear, and a plurality of floating planet elements individually having an outer planet gear intermeshed with the input sun gear, an inner planet gear intermeshed with the reaction ring gear, and an intermediate planet gear intermeshed with the output ring gear. Advantageously, an outboard rolling ring limits radially inward movement of the planet elements adjacent the outer planet gears, an inboard rolling ring limits radially inward movement of the planet elements adjacent the inner planet gears, and positioning means cooperatively engages the planet elements between the outer and inner planet gears and maintains the planet elements in a preselected axial position relative to the wheel.

More specifically, the balanced free-planet drive mechanism of the present invention provides a relatively significant speed reduction ratio of about 10:1 and features positioning means for maintaining the floating planet elements in the desired axial position relative to the output ring gear, use of relatively high operating pressure angle gearing geometry for minimizing normal forces under high speed and light load operation, means for locating the center of gravity of the floating planet elements within the intermesh of the output ring gear and the intermediate planet gears, and an efficacious manner of assembling the floating planet elements into the output ring gear utilizing a wheel cover as an assembly fixture.

Other objects and advantages of the present invention will become readily apparent upon reference to the accompanying drawings and following description.

BRIEF DESCRIPTION OF THE DRAWINGS

FIG. 2 is a diagrammatic, cross sectional view of the outboard portion of FIG. 1 at an enlarged scale to better illustrate details of construction thereof;

FIG. 3 is a diagrammatic, fragmentary, transverse sectional view as taken along the line III—III in FIG. 2 with stepped portions of the inboard, outboard and intermediate planet gears progressively broken away to show the intermeshing relationship thereof to the ring gears and the input sun gear; and FIG. 4 is a cross sectional view of an alternate embodiment floating planet element that could be substituted for the corresponding floating planet elements shown in FIGS. 1–3.

BEST MODE FOR CARRYING OUT THE INVENTION

Figure 1:
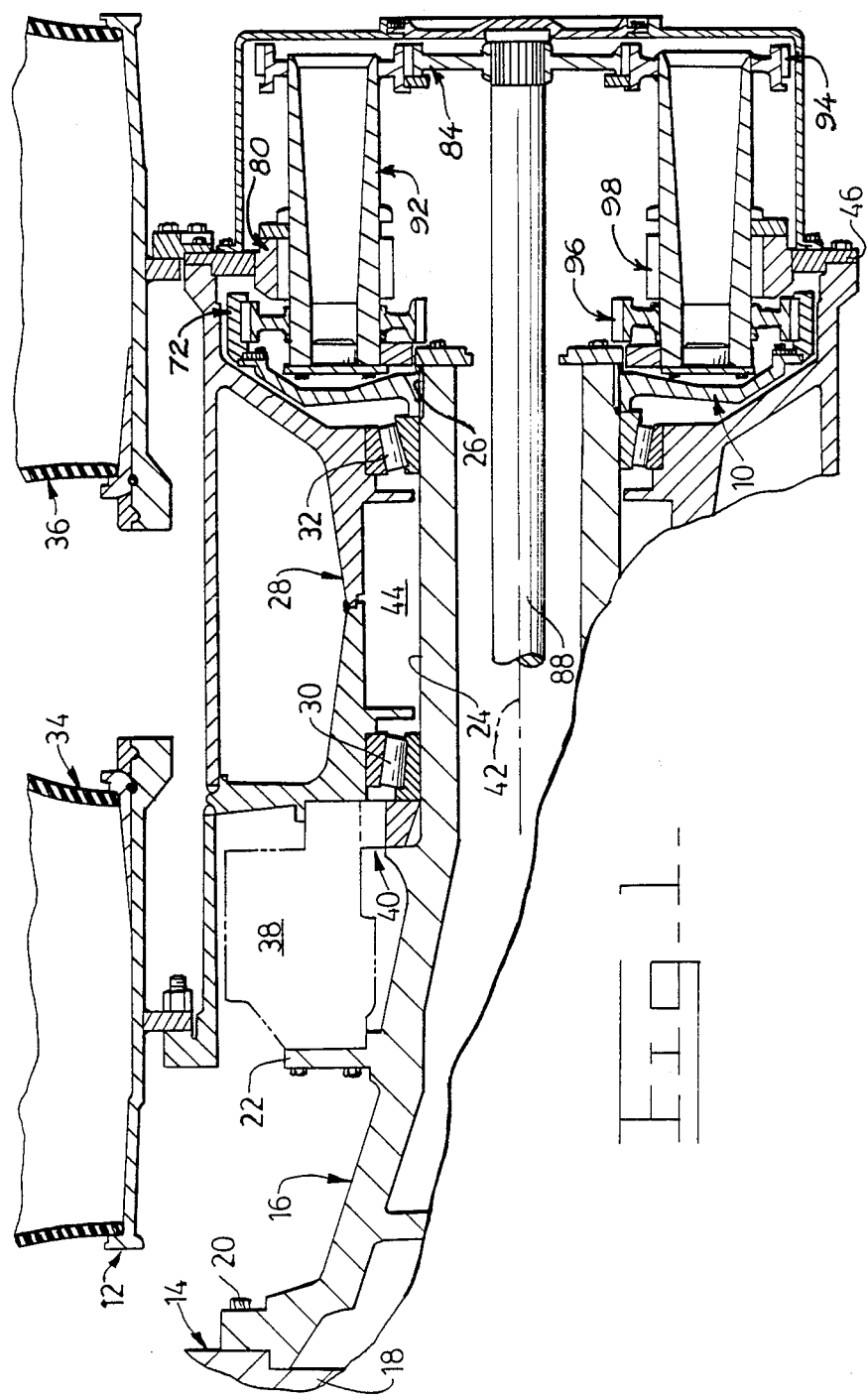
FIG. 1 is a diagrammatic, cross sectional view as taken through the central axis thereof of a balanced free-planet drive mechanism constructed in accordance with the present invention and illustrating a fragmentary portion of a wheel and a hollow support assembly associated therewith.

Referring to FIG. 1, a balanced free-planet drive mechanism 10 is disclosed in conjunction with a ground-engaging wheel 12 of a motor vehicle 14 such as a heavy duty off-highway truck, wheel tractor scraper, wheel loader or the like. A hollow support assembly or axle housing 16 is releasably secured to a vehicle frame member 18 by a plurality of annularly spaced fasteners or bolts 2, one of which is shown. On the one hand the support assembly includes an inboard, radially outwardly extending peripheral flange 22, an intermediate cylindrical exterior surface 24, and an external spline 26 at the outboard end thereof. And, on the other hand, the wheel 12 includes a hub 28 which is rotatably mounted on an inboard tapered roller bearing 30 and an outboard tapered roller bearing 32 seated at axially spaced apart positions on the surface 24 of the support assembly. In the instant embodiment, the wheel includes inboard and outboard ground-engaging rim and tire assemblies 34 and 36 of the usual type, although it is to be appreciated that the number of conventional rim and tire assemblies mounted on the hub can be one or more without departing from the spirit of the present invention. Also, a conventional disc-type brake assembly identified generally by the reference number 38 is operationally connected between the rotatable wheel hub 28 and the flange 22 of the fixed support assembly 16 to retard or stop the vehicle in the usual manner. And one or more conventional seal assemblies located at reference number 40 are concentrically arranged along a horizontal and transversely extending central axis 42 of the support assembly 16 immediately inwardly of the inboard tapered roller bearing 30 to define an enclosed chamber 44 generally within the wheel.

Referring to FIG. 2, the wheel 12 further includes an annular adapter member 46 and a first plurality of fasteners or bolts 48 which screwthreadably secure the adapter member to the wheel hub 28. A cover 50 having a radially outwardly extending inboard mounting flange 52 is releasably secured to the adapter member by a second plurality of fasteners or bolts 54. The cover 50 also includes a cylindrical wall 51, an outer side wall 53 connected thereto, and a round access plate 55 releasably secured to the side wall and whose purpose will be later explained. The outboard rim and tire assembly 36 defines a radially inwardly extending mounting flange 56 releasably connected to a tire rim 58, and third and fourth pluralities of circumferentially spaced fasteners or bolts 60 and 62 respectively connect the flange 56 solely to the adapter member 46, and the flange 56 and adapter member 46 together to the wheel hub 28.

More specifically, the drive mechanism 10 includes an annular retaining plate 64 defining an internal spline 66 which meshes with the external spline 26 on the support assembly 16. An annular locking member 68 is releasably secured to the outer end of the support assembly to contain the retaining plate and to adjustably maintain the tapered roller bearings 30 and 32 in their proper axial positions in the usual manner. A plurality of gear teeth 70 are defined on the outer periphery of the retaining plate 64, and a reaction ring gear 72 has a plurality of internal spur gear teeth 74 which are intermeshingly engaged with the gear teeth 70. The reaction ring gear is axially held in place by a plurality of radially outwardly extending tabs 76 releasably secured to the retaining plate, and received in an annular groove 78 formed in the internal periphery of the gear teeth 74.

In the embodiment illustrated, the adapter member 46 defines an output ring gear 80 having a plurality of internal spur gear teeth 82, but it is also contemplated that such ring gear could be a separate member releasably secured to the adapter member, although not shown.

An input sun gear 84 having a plurality of external spur gear teeth 86 is releasably secured to an elongate input axle shaft 88 by a spline joint 90. The shaft and sun gear are controllably rotated about the central axis 42 in any conventional manner.

Pursuant to the present invention, the drive mechanism 10 has a plurality of floating planet elements 92 which individually include an axially outer gear or outboard planet gear 94, an axially inner gear or inboard planet gear 96, and an axially intermediate planet gear 98 located between them. Preferably, the intermediate gear 98 is formed as an integral part of a tubular planet shaft 100 and includes a plurality of crowned spur gear teeth 102 and an annular groove 104 disposed in an intersecting relationship with the gear teeth. As can be noted from FIG. 2, the planet shaft is tapered from a radially thin outboard cross section to a radially thick inboard cross section, and an inboard end cap 106 is releasably secured thereto by a plurality of fasteners or bolts 108. The construction is designed to locate the center of gravity 110 of the orbiting planet elements 92 in an inboard direction near to, or adjacent to a transverse center plane 112 through the axial midpoint of the intermediate gear 98. Positioning means 113 are provided for maintaining the planet elements 92 in a preselected axial position relative to the output ring gear 80 for alignment purposes, and for bidirectionally transmitting a relatively small amount of thrust therefrom to the wheel hub 28. Such positioning means are axially located adjacent the output ring gear 80, and preferably includes ring means in the form of a plurality of arcuately shaped ring segments or retention members 114 which are individually lighter and easier to handle. These ring segments, two of which are illustrated in cross section in FIG. 2, are releasably secured to the outboard surface of the output ring gear by a plurality of fasteners or bolts 116. The ring segments 114 are preferably of hardened and ground steel material, extend radially inwardly into the grooves 104 of the planet elements 92, and bear against one of the side edges 105 of the grooves at the pitch line of the gear teeth 102 in order to minimize sliding losses. In essence, the ring segments transfer any light axial thrust forces from the planet elements to the output ring gear. As is also shown in FIG. 3, the crowned spur gear teeth 102 of the intermediate gears 98 are intermeshingly engaged with and normally drive the straight spur gear teeth 82 of the output ring gear 80.

As shown in FIG. 2, the outer gear 94 of the planet elements 92 is preferably machined separately and rigidly secured to a smooth cylindrical surface 103 of the planet shaft 100 by a suitable weld joint 118. A plurality of straight spur gear teeth 120, defined by the outer gear 94, mesh with the straight spur gear teeth 86 of the sun gear 84 as may be noted by reference to FIG. 3. Another annular groove 122 is formed in the gear teeth 120 which is defined in part by a cylindrical surface 123 that is smaller than the root diameter of the gear teeth 120.

Each of the planet elements 92 has a central axis 119, and in carrying out the present invention rolling ring means 121 are provided for limiting radial inward movement of the planet elements therealong by resisting radial inward forces therefrom and for generally maintaining the axes 119 parallel with the central axis 42 of the drive mechanism 10. As shown by FIG. 2, the rolling ring means 121 includes an outboard rolling ring 124 that is generally concentrically arranged along the axis 42, is seated within the annular grooves 122 of the outer gears 94, and is adapted to rollingly engage the outer gears.

The inner gear 96 of the planet elements 92 is also preferably made separately and rigidly secured to a smooth cylindrical surface 125 of the planet shaft 100 by a weld joint 126. As may be appreciated by reference to FIGS. 2 and 3, the inner gear has a plurality of crowned spur gear teeth 128 which intermesh with the straight spur gear teeth 74 of the reaction ring gear 72. A cylindrical surface 130 is defined on the inboard end of the planet shaft which terminates at an inwardly facing shoulder 132 adjacent the inboard side surface of the inner gear. A wear-resistant ring 133 is seated firmly on the cylindrical surface 130 in abutment with the shoulder, and the rolling ring means 121 includes an inboard rolling ring 134 that is also generally concentrically arranged along the axis 42 and adapted to normally rollingly engage that cylindrical surface. A wear-resistant flange or shoulder 136 on the end cap 106 serves with the ring 133 to axially entrap the inboard rolling ring therebetween.

In keeping with the present invention, the pitch midpoints 138 of the outboard mating gears 84 and 94, the pitch midpoints 140 of the intermediate mating gears 80 and 98, and the pitch midpoints 142 of the inboard mating gears 72 and 96 are arranged in a plurality of straight force-balance lines 144, with one balance line being provided for each of the floating planet elements 92. These force-balance lines reside at the intersection of the surface of a theoretical cone and a plurality of planes passing through the central axis 42 and the individual axes 119 of the floating planet elements 92.

Although not illustrated, one or more fixtures are used to guide the outboard and inboard gears 94 and 96 axially onto the respective cylindrical mounting surfaces 103 and 125 of the individually planet shafts 100 so as to maintain the accurate rotary disposition thereof relative to the integral intermediate gears 98. In this way the three gears 94, 96 and 98 can be properly indexed with each other before the weld joints 118 and 126 are made. Preferably, the gears 94 and 96 are secured positively to the shaft by electron beam welding which generates minimal distortion when compared to other welding techniques. It is contemplated, however, that the mounting surfaces 103 and 125 could be slightly conical or tapered such that the gears 94 and 96 could be gently pressed thereon without departing from the spirit of the present invention.

ALTERNATE EMBODIMENT

It is further contemplated that the floating planet elements 92' be constructed as shown in the alternate embodiment of FIG. 4. The planet shaft 100' in this instance has outboard spline teeth 146 and inboard spline teeth 148 having the same pitch and number of gear teeth as the integral gear teeth 102' of the intermediate gear 98' By the term "integral" it is meant that the gear teeth 102' are of one-piece construction with the body of the planet shaft 100' Thus the spline teeth 146 and 148 can be cut at the same time as the gear teeth 102, so that index accuracy can be maintained for all three sets. Also, the outboard spline teeth 146 are truncated or radially cut down in height in order to provide an outwardly facing shoulder 150 to limit axially inward movement of the separately machined outboard gear 94' intermeshingly engaged therewith. A conventional retaining ring or snap ring 152 is secured to the spline teeth 146 to limit axially outward movement of the outboard gear 94'. Likewise the inboard spline teeth 148 are truncated to provide an inwardly facing shoulder 154 serving to more positively limit the axially outward movement of the separately manufactured inboard gear 96' mounted thereon. A hardened, split thrust ring 156 and a conventional retaining ring or snap ring 158 are connected to the spline teeth 148 to limit the axially inward movement of the inboard gear 96'.

INDUSTRIAL APPLICABILITY

In operation, the input shaft 88 is controllably mechanically driven through a conventional transmission and differential assembly, not illustrated, at any speed up to a preselected maximum speed. The individual numbers of gear teeth provided in one embodiment of the balanced free-planet drive mechanism 10 utilizing six of the floating planet elements 92 are shown by the chart immediately below:

| Number of Gear Teeth |
| --- |
| Gear 84 (teeth 86) 72 = N1 |
| Gear 94 (teeth 120) 54 = N2 |
| Gear 98 (teeth 102) 18 = N3 |
| Gear 80 (teeth 82) 84 = N4 |
| Gear 96 (teeth 128) 30 = N5 |
| Gear 72 (teeth 74) 96 = N6 |

The floating planet elements 92 must have the proper relationship in the numbers of the gear teeth in order to properly assemble them. In this instance, there are six planet elements and the teeth numbers are generally divisible by six. With five planet elements, the teeth numbers would be divisible by five, for example. The gear teeth 120, 102, 128 on one planet element are likewise all maintained in an indexed relationship to each other. However, other tooth numbers than those divisible by the number of planet elements are possible by following a common denominator calculation procedure.

The sun gear 84 on the input axle shaft 88 drives the six outer gears 94 of the planet elements 92. This rotation is opposed by the fixed reaction ring gear 72, causing the orbiting of the mating inner gears 96. The intermediate gears 98 of the planet elements, having a lesser tangential velocity, pull along the output ring gear 80 and the wheel 12 connected therewith. In the above-noted embodiment, a reduction ratio of 10.82:1 is provided so that if the sun gear 84 is rotatably driven at 1287 rpm, then the wheel rotates at 119 rpm which is approximately 40 mph vehicle speed. At such speed, the planet elements 92 rotate at about 833 rpm about their own axes 119 and are orbiting around the central axis 42 at about 378 rpm.

The pitch midpoints 138, 140 and 142 are in exact straight lines in a conical relationship so that the planet elements 92 are, tangentially, in force and moment balance. The moments induced by the opposing tangential forces on the inner and intermediate gears 96 and 98 are balanced by the tangential force from the sun gear 84 on the outer gear 94, which is appropriately positioned axially along the planet shaft 100. The radially inward forces imposed on the planet shaft 100 by the ring gears 72 and 80 are balanced by the floating, rolling rings 124 and 134. Any axial thrust loads on the planet elements 92 are taken by the ring segments 114 adjacent to the output mesh of the gear teeth 82 and 102. Contact of the planet elements 92 with these ring segments is therefore advantageously located near the intermediate pitch midpoint 40 of that mesh so sliding velocity is very low.

The relative axial positions of the planet gears 94, 98 and 96 and the rolling rings 124 and 134 are such that under load and at low speed there is an inward radial force on both of the rolling rings. However, the outboard rolling ring 124 is optional. The operating pressure angles of the intermeshing gear teeth 74/128 and 82/102, and the axial positions of these meshes and the inboard rolling ring 134 can be adjusted to cause the net radial force at the outboard planet gears 94 to equal or be very close to the radial force of the intermeshing gear teeth 86/120 so that the outboard rolling ring 124 could be eliminated. It is preferable not to eliminate this rolling ring, however, because it is helpful as an assembly aid, is useful in the event that it is desired to remove the sun gear 84, and can share radially loading with the sun gear.

At high speed, centrifugal forces cause the planet elements 92 to move outwardly radially as far as possible. This force is accommodated to a large extent by designing the mesh of the gears 80 and 98 to operate at a relatively high operating pressure angle, for example, above about 25° and preferably from 25° to 30° so that they can successfully run in a tight mesh condition. The mesh of gears 72 and 96 can also be designed with this same high operating pressure angle relationship. The planet gears 96 and 98 can then run in tight mesh against the ring gears 72 and 80 respectively under the considerable centrifugal forces of high speed, light load operation without producing unacceptably high gear normal loads. By providing such mesh and by using solely internally located rolling rings 124 and 134, the extra cost and the assembly problems associated with prior art constructions which utilize both internally located and externally located rolling rings are avoided.

Furthermore, the center of gravity 110 of the planet elements 92 including the end caps 106 is located slightly outboard from the transverse center plane 112, and preferably axially within the mesh of the gears 80 and 98. This assures that the axes 119 of the planet elements 92 will remain substantially parallel to the central axis 42 when they move radially outward into tight mesh with the ring gears 80 and 72 during high speed, light load running conditions. As a result, the gear teeth 74/128 and 82/102 will remain in an aligned, approximately full face contact relationship for minimum tooth unit loading. This results in minimum contact stresses and maximum pitting life.

The drive mechanism 10 is also convenient to assemble. Assembly begins by fastening the ring segments 114 to the output ring gear 80 and/or to the adapter member 46. The adapter member is then secured to the cover 50 which is standing on end so that the side wall 53 is facing downwardly. The planet elements 92 are then individually inserted from above to hang from the ring segments 114 and are rolled into contact with each other in order to allow peripheral room for inserting the remaining planet elements. When the full complement of planet elements has been installed, they are rolled to equally spaced apart positions. This peripheral support radially away from the central axis 42 creates a central clearance large enough to insert from above the relatively smaller outboard rolling ring 124 and, if desired at this time, the input sun gear 84. It is of interest to appreciate that the individual planet elements initially hang crooked because of the edge support on the ring segments and, preferably, the outer gears 94 swing radially and axially outwardly at the radially inner portion thereof to a point of abutting contact with the outer side wall 53. This allows the outboard rolling ring 124 to be easily inserted in the annular grooves 122 of the planet elements. Thereafter, the upper ends of the planet elements are urged radially outwardly to allow the relatively larger inboard rolling ring 134 to be inserted from above into engagement with the cylindrical surfaces 130 of the planet elements. Then the end caps 106 are secured to the inboard ends of the planet elements by the screwthreaded installation of the bolts 108. With the end caps installed, the subassembly becomes "determinate" and may be transported as a unit in any angular attitude. This subassembly can thereafter be installed along the central axis 42 of the wheel hub 28 so that the inner gears 96 are intermeshed with the reaction ring gear 72 and then the adapter member 46 secured to the hub 28 by the bolts 48.

For towing of the vehicle 14, the small access plate 55 can be removed with little loss of oil within the enclosed chamber 44, and the sun gear 84 subsequently removed. The axle shaft 88 can also be pulled outwardly at this time if desired. Inspection of the gear meshes can be made through the access plate opening, although a complete view would require draining of the oil from the chamber. While outboard rolling ring 124 could be eliminated, it is desirable because it serves as a radial locator for the planet elements 92 when the sun gear 84 is not in position.

In comparison with one two-stage planetary gear set final drive used commercially on a large off-highway truck, the drive mechanism 10 was noted to be 28% lighter in weight and 17% more economical in cost while providing the same general speed reduction ratio. Also, the number of parts in the final drive was reduced by 35%. It is projected that the drive mechanism 10 is suitable for speed reduction ratios at least between 8:1 to 20:1.

Other aspects, objects and advantages of this invention can be obtained from a study of the drawings, the disclosure and the appended claims.

We claim:

1. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear intermeshed with the output ring gear; and
   rolling ring means for limiting radial inward movement of the planet elements, the rolling ring means being substantially concentrically disposed on the central axis.

2. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear intermeshed with the output ring gear; and
   rolling ring means for limiting radial inward movement of the planet elements, the rolling ring means being substantially concentrically disposed on the central axis and including an outboard rolling ring for resisting radially inward movement of the planet elements.

3. The drive mechanism of claim 2 wherein the rolling ring means includes an inboard rolling ring for resisting radially inward movement of the planet elements.

4. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear intermeshed with the output ring gear; and
   rolling ring means for limiting radial inward movement of the planet elements, the rolling ring means being substantially concentrically disposed on the central axis and including an outboard rolling ring and an inboard rolling ring located radially inwardly of the planet elements, the planet elements being rollingly engaged therewith.

5. The drive mechanism of claim 4 wherein the outboard rolling ring is axially located adjacent the outer gear of the planet elements.

6. The drive mechanism of claim 5 wherein the inboard rolling ring is axially located adjacent the inner gear of the planet elements.

7. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear intermeshed with the output ring gear;
   rolling ring means for limiting radial inward movement of the planet elements, the rolling ring means being substantially concentrically disposed on the central axis; and
   positioning means for maintaining the planet elements in a preselected axial position relative to the output ring gear.

8. The drive mechanism of claim 7 wherein each of the planet elements defines an annular groove having a pair of side edges, and the positioning means includes ring means connected to rotate with the output ring gear for contacting the side edges adjacent the intermesh of the intermediate gears and the output ring gear and minimizing sliding losses.

9. The drive mechanism of claim 8 wherein the wheel includes a hub and an adapter member releasably secured thereto, and the output ring gear is connected to the adapter member.

10. The drive mechanism of claim 9 wherein the wheel includes a cover releasably secured to the adapter member.

11. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear having a plurality of intermediate gear teeth intermeshed with the output ring gear;
   rolling ring means for limiting radial inward movement of the planet elements, the rolling ring means being substantially concentrically disposed on the central axis; and
   wherein each of the planet elements includes a hollow shaft for reducing centrifugal forces thereupon and means releasably secured to the hollow shaft for axially locating a collective center of gravity thereof within the width of the intermediate gear teeth.

12. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including a generally tubular shaft having thereon an axially outer gear intermeshed with the sun gear, an axially inner gear intermeshed with the reaction ring gear, and an axially intermediate gear intermeshed with the output ring gear, the generally tubular shaft defining the axially intermediate gear integrally therewith and wherein the axially outer and axially inner gears are separate elements which are individually secured to the tubular shaft in an indexed relationship with the intermediate gear; and
   rolling ring means for limiting radial inward movement of the planet elements, the rolling ring means being substantially concentrically disposed on the central axis.

13. The drive mechanism of claim 12 wherein each of the tubular shafts defines outboard and inboard spline teeth having the same pitch and number of teeth as the intermediate gear, the axially outer gear being releasably engaged with the outboard spline teeth and the axially inner gear being releasably engaged with the inboard spline teeth.

14. The drive mechanism of claim 12 wherein each of the tubular shafts defines outboard and inboard cylindrical surfaces for mountingly securing the axially outer and inner gears respectively, and weld joints are provided at the surfaces for positively securing the gears of the shaft.

15. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear intermeshed with the output ring gear, and wherein the axially inner and intermediate gears have crowned teeth; and
   rolling ring means for limiting radial inward movement of the planet elements, the rolling ring means being substantially concentrically disposed on the central axis.

16. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear intermeshed with the output ring gear, and wherein the output ring gear and the axially intermediate gear have intermeshing gear teeth having a relatively high operating pressure angle above about 25°; and
   rolling ring means for limiting radial inward movement of the planet elements, the rolling ring means being substantially concentrically disposed on the central axis.

17. The drive mechanism of claim 20 wherein the reaction ring gear and the axially inner gear have intermeshing gear teeth having a relatively high operating pressure angle above about 25°.

18. A balanced free-planet drive mechanism comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an axially outer gear intermeshed with the sun gear, an axially inner gear intermeshed with the reaction ring gear, and an axially intermediate gear intermeshed with the output ring gear;
   rolling ring means for limiting radial inward movement of the planet elements, the rolling ring means being substantially concentrically disposed on the central axis; and wherein each of the floating planet elements has means for adjusting the center of gravity thereof axially within the mesh of the intermediate gear and the output ring gear.

19. A balanced free-planet drive mechanism comprising:
   a hollow support assembly;
   an output ring gear rotatably mounted on the support assembly;
   a reaction ring gear connected to the support assembly;
   an input sun gear;
   a plurality of floating planet elements individually including a planet shaft and first, second and third planet gears connected for joint rotation with the planet shaft, the first planet gears being intermeshed with the sun gear at a plurality of first pitch midpoints, the second planet gears being intermeshed with the output ring gear at a plurality of second pitch midpoints, and the third planet gears being intermeshed with the reaction ring gear at a plurality of third pitch midpoints, with the planet gears being so constructed and arranged that the first, second and third pitch midpoints of each floating planet element are in straight lines for force-balancing purposes;
   rolling ring means for solely limiting radial inward movement of the floating planet elements; and
   positioning means for maintaining the planet elements in a preselected axial location relative to the output ring gear.

20. The drive mechanism of claim 19 wherein the rolling ring means includes a first rolling ring in rolling engagement with the planet elements adjacent the first planet gears, and a second rolling ring in rolling engagement with the planet elements adjacent the third planet gears.

21. The drive mechanism of claim 20 including a wheel and bearing means for rotatably supporting the wheel on the support assembly, and wherein the output ring gear is connected to rotate with and normally drive the wheel.

22. The drive mechanism of claim 20 wherein each of the planet elements includes a hollow shaft and adjustment means for adjustably positioning the center of gravity of the planet elements axially towards a transverse central plane passing through the second pitch midpoint.

23. The drive mechanism of claim 22 wherein each of the hollow shafts defines a cylindrical surface adapted to engage the second rolling ring, and the adjustment means includes an inboard end cap releasably secured to the hollow shaft in an axially retaining relationship to the second rolling ring.

24. The drive mechanism of claim 19 wherein the positioning means includes a groove defined in each of the planet elements and ring means for cooperative thrust-transmitting engagement with the groove of the planet elements, the ring means being releasably connected to the output ring gear.

25. The drive mechanism of claim 19 wherein the second and third planet gears individually have crowned spur gear teeth.

26. The drive mechanism of claim 19 wherein each of the planet elements has a hollow shaft, and the first and third planet gears are rigidly secured to the hollow shaft by weld joints.

27. The drive mechanism of claim 19 wherein the output ring gear and the second planet gears have intermeshing gear teeth having a pressure angle between 25° and 30°.

28. A balanced free-planet drive mechanism for a motor vehicle, comprising:
   a hollow support assembly;
   a ground-engaging wheel rotatably mounted on the support assembly along a central axis;
   a reaction ring gear connected to the support assembly;
   an output ring gear connected to the wheel;
   an input sun gear arranged along the axis;
   a plurality of floating planet elements individually including an outer planet gear intermeshed with the sun gear, an inner planet gear intermeshed with the reaction ring gear, and an intermediate planet gear intermeshed with the output ring gear;
   an outboard rolling ring limiting radially inward movement of the planet elements adjacent the outer planet gears;
   an inboard rolling ring limiting radially inward movement of the plant elements adjacent the inner planet gears; and
   positioning means for maintaining the planet elements in a preselected axial location relative to the wheel, the positioning means cooperatively engaging the planet elements axially between the outer and inner planet gears.

29. The drive mechanism of claim 28 wherein the positioning means includes a groove defined in each of the intermediate planet gears, and a plurality of retention members connected to rotate with the output ring gear and adapted to extend radially inwardly into the grooves of the intermediate gears.

* * * * *